United States Patent

Eriksson et al.

Patent Number: 6,119,447
Date of Patent: Sep. 19, 2000

[54] ARRANGEMENT AND METHOD FOR DETERMINING THE OXYGEN BUFFER CAPACITY IN A CATALYTIC CONVERTER

[75] Inventors: Sören Eriksson, Göteborg; Ronald Hedström, Veddige; Ove Hjortsberg; Mats Laurell, both of Göteborg, all of Sweden

[73] Assignee: AB Volvo, Göteborg, Sweden

[21] Appl. No.: 08/973,174

[22] PCT Filed: May 31, 1996

[86] PCT No.: PCT/SE96/00724

§ 371 Date: Feb. 24, 1998

§ 102(e) Date: Feb. 24, 1998

[87] PCT Pub. No.: WO96/41071

PCT Pub. Date: Dec. 19, 1996

[30] Foreign Application Priority Data

Jun. 7, 1995 [SE] Sweden ................................ 9502066

[51] Int. Cl.[7] .................................................... F01N 3/00
[52] U.S. Cl. .............................. 60/274; 60/277; 60/285; 73/118.1
[58] Field of Search .......................... 60/274, 277, 285; 73/118.1

[56] References Cited

U.S. PATENT DOCUMENTS

| | | | |
|---|---|---|---|
| 5,159,810 | 11/1992 | Grutter et al. | 60/274 |
| 5,207,057 | 5/1993 | Kayanuma . | |
| 5,228,335 | 7/1993 | Clemmens et al. . | |
| 5,267,472 | 12/1993 | Schneider et al. . | |
| 5,293,740 | 3/1994 | Heppner et al. . | |
| 5,335,538 | 8/1994 | Blischke . | |
| 5,379,591 | 1/1995 | Iwata et al. | 60/285 |
| 5,406,789 | 4/1995 | Takizawa et al. | 60/277 |
| 5,533,332 | 7/1996 | Uchikawa | 60/277 |
| 5,544,481 | 8/1996 | Davey et al. | 60/277 |
| 5,602,737 | 2/1997 | Sindano et al. | 73/118.1 |
| 5,609,023 | 3/1997 | Katoh et al. | 60/276 |
| 5,622,047 | 4/1997 | Yamashita et al. | 60/274 |
| 5,644,912 | 7/1997 | Kawamura | 60/285 |
| 5,678,402 | 10/1997 | Kitagawa et al. | 60/285 |

FOREIGN PATENT DOCUMENTS

| | | |
|---|---|---|
| 0466311 | 1/1992 | European Pat. Off. . |
| 38 30 515 | 3/1990 | Germany . |
| 94/15086 | 7/1994 | WIPO . |
| 94/20737 | 9/1994 | WIPO . |
| 94/21902 | 9/1994 | WIPO . |
| 95/17588 | 6/1995 | WIPO . |

*Primary Examiner*—Thomas E. Denion
*Attorney, Agent, or Firm*—Royston, Rayzor, Vickery, Novak & Druce, L.L.P.

[57] ABSTRACT

The invention relates to an arrangement for determining the oxygen buffer capacity in a catalytic converter (1) of an exhaust system. The arrangement includes an oxygen sensor (3, 32, 33) located downstream of at least one converter matrix (30, 31), where the sensor (3, 32, 33) supplies an input signal to a fuel injection control unit (4). The arrangement includes an analyzer circuit (13) for determining time information (TP) about the fluctuation of said input signal (25, 26), and calculating means for calculating the oxygen buffer capacity based on said time information (TP) when the downstream sensor is used to provide a primary control input signal (26). The invention also relates to a method of determining the buffer capacity.

17 Claims, 4 Drawing Sheets

ARRANGEMENT AND METHOD FOR DETERMINING THE OXYGEN BUFFER CAPACITY IN A CATALYTIC CONVERTER

FIELD OF THE INVENTION

The invention relates to an arrangement of the type defined in the preamble of claim 1 and to a method as defined in the preamble of claim 7 and 8 for determining the oxygen buffer capacity of a catalytic converter.

The invention also relates to a method for controlling the air/fuel ratio of a vehicle engine, based on the determination of the oxygen buffer capacity.

BACKGROUND TO THE INVENTION

Catalytic converters for vehicle exhaust systems are well known. Such converters are typically constructed by having a housing within which one or more converter bricks (often called converter matrices) are arranged. Each of the bricks has a washcoat containing one or more rare metals typically chosen amongst the elements of platinum, rhodium or palladium.

The washcoat provides a plurality of catalytic reaction sites on which oxygen which is temporarily stored within the catalytic converter as a buffer (i.e. an amount of surplus oxygen for later use) during lean mixture running, can undergo catalytic oxidation reactions with one or all of the following gases: carbon monoxide (CO), hydrocarbons (HC) and nitrous oxides ($NO_x$) of various types. Where a three-way catalytic converter is provided, all the gases undergo oxidation reactions.

It has been observed previously however that the oxygen buffer capacity of the catalytic converter diminishes with time. In turn, the conversion capabilities of the catalytic converter become steadily reduced such that the catalytic converter will be unable to cope with large fluctuations in the value of A (commonly adopted measure of air/fuel ratio). Such large fluctuations may occur for instance when the engine's fuel injection control unit alters the injection time so as to achieve stoichiometric combustion conditions in the engine during acceleration or deceleration.

It is known that by taking a reading of the outputs of the front and rear oxygen sensors (typically so-called "lambda" sensors) and processing these values, a depleted buffer capacity can be detected thus allowing a deteriorated catalytic converter to be replaced in good time.

One such method for determining the presence of a reduced buffer capacity of a catalytic converter is disclosed in e.g. DE-A-38 30 515, in which the difference in the oxygen content of the exhaust gas both upstream and downstream of the catalytic converter is measured. By comparing the quotient of this difference to the oxygen quantity upstream of the catalytic converter, a value is obtained which can be compared to known values. On the basis of the comparison, the condition of the catalytic converter is determined so that replacement of the catalytic converter at an appropriate time can be instigated.

In a further prior art device for determining catalytic deterioration as disclosed in U.S. Pat. No. 5,228,335, the oxygen content signals from an oxygen sensor upstream and an oxygen sensor downstream of the catalytic converter are fed into a microprocessor and compared to threshold values. On the basis of said comparison, the deterioration level is determined.

The aforementioned prior art methods thus rely on the detection of a specific set of conditions arising in order to be able to determine catalytic converter failure.

The present invention aims at providing an arrangement and method for determining the size of the oxygen buffer capacity of a catalytic converter, in particular at repeated intervals during engine operation so that updated information on buffer capacity is available.

In a further aspect of the invention, the value of the oxygen buffer capacity is used to provide a control input to the fuel injection control unit to alter the fuel injection to said engine in order to compensate for reduced buffer capacity. Any method of measuring oxygen buffer capacity can be used to provide the required information for such compensation.

SUMMARY OF THE INVENTION

The features of the present invention are defined in the independent claims. Preferred features of the invention are defined in the dependent claims. Further advantageous features also appear in the following description.

In accordance with the invention, use is made of the signal which is emitted by the downstream oxygen sensor of a catalytic converter system.

As is known per se, the signal output of the upstream sensor of a catalytic converter system is one which fluctuates very rapidly and basically periodically between high and low voltage output. This output is used as a primary control input for a fuel injection control system to control whether an increase or decrease in the amount of fuel should be supplied to a fuel injector (i.e. whether a richer or weaker mixture is required) Due to the fact that the upstream oxygen sensor tries to provide almost stoichiometric combustion conditions, the output of the downstream sensor is a fairly even, or slowly varying voltage, as it provides only a fine-tuning of the air/fuel ratio required.

However, in accordance with the invention, the downstream sensor is used to provide the primary input signal to the fuel injection control unit instead of the upstream sensor. In this way, the adjustment of the oxygen content of the exhaust gases coming through the catalytic converter will cause a rapidly fluctuating output signal from the downstream sensor.

By analyzing aspects of the time function of this output signal (which is also an input signal for a fuel injection control unit) the actual size of the oxygen buffer capacity can be determined. The method of analysis will be explained in more detail below.

Since the oxygen buffer capacity is reduced during the life of a catalytic converter, the time taken to use up the buffer, and then to refill it with more oxygen from the exhaust gases during normal engine running, will be correspondingly reduced. Additionally, when the primary input to the fuel injection control unit comes from the downstream sensor, the periodic time taken for the sensor to send a signal to richen or to weaken the air/fuel mixture will be relatively long compared to that during normal operation of the upstream sensor. This is due to the fact that the exhaust gases take a finite time to pass through the converter and also a finite time to use up the stored oxygen buffer. Consequently it will be apparent that when the oxygen buffer capacity is reduced, the periodic time of the fluctuations in the signal from the downstream sensor will be similarly reduced. In one embodiment of the invention, this reduction in periodic time is measured and compared to known values of periodic time for different sizes of oxygen buffer capacity. In this way the buffer capacity can be closely determined.

As an alternative method of using time information of the signals emanating from the oxygen sensor, the output signals of both the upstream sensor and the downstream sensor may be used to determine the oxygen buffer capacity by measuring their time displacement (phase-shift). This is carried out in a similar manner to the above. Namely, the downstream sensor is again used to supply the primary input to the fuel injection control unit and then the outputs of the upstream and the downstream sensor are analyzed. The outputs of the upstream and downstream sensors will be very similar, although as will be seen in the accompanying figures, the signal of one is delayed in time with respect to the other. Measuring the time displacement will thus reveal the oxygen buffer capacity when compared to known values of time displacement.

The time during which the downstream sensor is used to supply the primary control input may be as short as one time period, but will typically be four or more time periods so that a mean value of time period can be calculated and so that any transient effects from non-oxidised gases will be reduced.

In order to allow the downstream sensor to provide the primary control input for the fuel injection control unit, a switching means of some kind is provided. This switching means will typically be an electronic switching means which is responsive to a series of control parameters.

Additionally, in order to be able to compare measured time information (e.g. periodic time of the fluctuations) with known values, the measurements should occur within a so-called window of parameters. For example, when considering the parameters of engine load and speed, a particular engine load and engine speed may result in a different set of measured values from a different engine load. Similarly if the engine is not operating at a steady temperature (typically during the warm-up phase) the readings will be different from when the engine is operating at a steady temperature. Thus at least one window of pre-determined parameters should be defined, in which the signal sampling is conducted. Typically the window will be within the normal driving cycle parameter range of the engine. A plurality of windows may also be provided so that it is easier to have sampling during each vehicle use.

Since however it is not possible to provide an infinite number of windows, a correction factor should be applied where possible. In particular, it has now been found that the mass flow (of fuel and air, or air only) affects the time period of the signal fluctuations in an approximately linear manner. Thus an adjustment can be made such that the signal sampling can be carried out under virtually any known mass flow conditions with good correspondence. In some cases the oxygen storage is dependent on the temperature of the catalytic converter and an adjustment may also be required for this reason.

The measure of oxygen buffer capacity can be used to indicate the present condition of the catalytic converter and/or when replacement is required. Moreover, the results may however be used to control the fuel input to the engine so that the gas content of the exhaust gases stays within the acceptable limits for the buffer capacity which has been determined. This fuel injection input control is thus a compensation input control which will lead to reduced emissions in vehicles having catalytic converters with reduced oxygen buffer capacity.

This is due to the fact that by not using up all the oxygen buffer, i.e. by lying within the limits of the oxygen buffer somewhere close to the middle thereof when catalytic reactions take place, the catalytic converter is better able to take care of transients. Thus the modification of the air/fuel ratio from $\lambda=1$ to a lower value (i.e. to a richer mixture) for a limited period of time may be required to reduce the oxygen content of the available oxygen buffer capacity.

It should be observed that the expression "fuel injection control unit" may relate to a single control unit system, but that several control units may be included within said control unit so as to perform the required control functions.

BRIEF DESCRIPTION OF THE DRAWINGS

The invention will now be described in more detail with reference to certain preferred embodiments and with reference to the accompanying drawings, in which.

DESCRIPTION OF PREFERRED EMBODIMENTS

Figure 1:
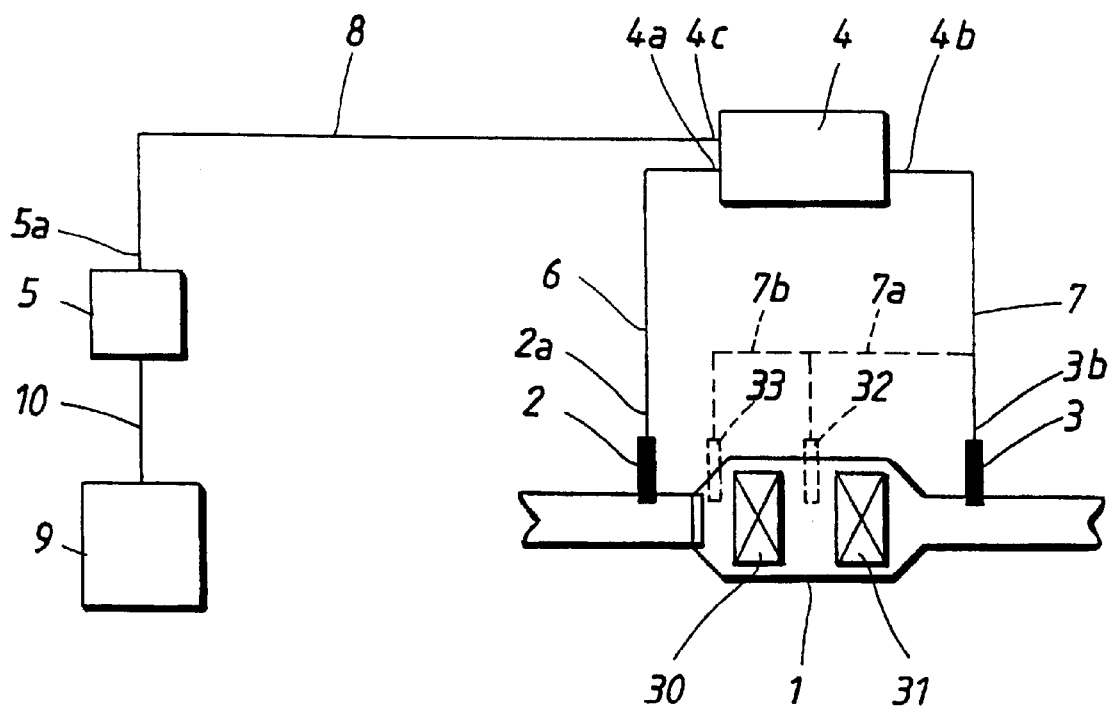
FIG. 1 is a block diagram showing a typical arrangement for use in accordance with the invention.

The arrangement shown in FIG. 1 comprises a catalytic converter having two converter matrices 30, 31. The invention may however be carried out with any number of matrices. The converter 1 has an inlet on the left hand side (as depicted) and an outlet on the right hand side. Although the connection is not shown, the inlet to the catalytic converter 1 is connected to an exhaust outlet of an engine 9.

An oxygen sensor 2 is placed at the upstream end of the catalytic converter and a further oxygen sensor 3 is placed downstream of the catalytic converter in the direction of flow of exhaust gases. The downstream sensor may however be placed at any other location downstream of the first sensor as long as it is also downstream of at least one catalytic converter matrix. Thus alternative positions 32 and 33 for the downstream sensor are shown in dashed lines.

For the sensor location 33, it is presumed that there is a converter matrix between the sensor 2 and the matrix 30 as is known per se in certain systems.

Each of the sensors has an output 2a, 3b which is transmitted via a connection 6 and 7 respectively to a fuel injection control unit 4. The connections 6 and 7 are typically electrical conductors, but radio signals or light-transmitting cables could be used. Said outputs 2a and 3b then provide respective input signals at inputs 4a and 4b of the control unit 4. An output 4c of unit 4 is then connected via line 8 to an input 5a of a fuel injector means 5 (e.g. a fuel injector and/or a fuel pump) which, in turn, supplies fuel to engine 9 via line 10. Line 10 would normally be part of the inlet manifold unless direct injection is involved.

During normal operation (i.e. all operation apart from when a test sampling of the signal is to be performed), the upstream sensor 2 is used to provide a primary control voltage input to the unit 4. On the basis of this input, a voltage is fed through line 8 so as to control when, and for how long, fuel is to be supplied by injector 5 to the engine 9. The control is normally set up so that, on the basis of the oxygen quantity in the exhaust gas present at sensor 2, a ratio of close to λ=1 should be achieved. Similarly, the downstream sensor 3, during normal operation, finely adjusts the air/fuel ratio based on the oxygen content of the exhaust gases after passage through the catalytic converter.

Figure 2:
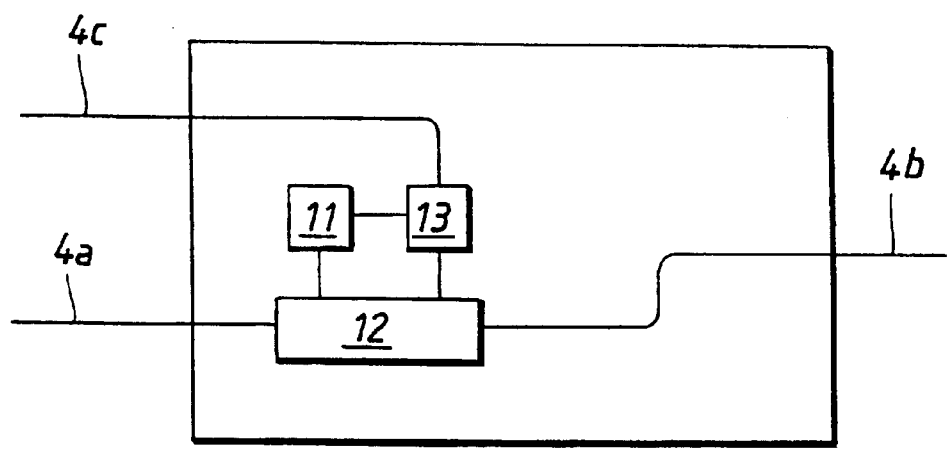
FIG. 2 is a block diagram of one of the elements in FIG. 1.

FIG. 2 shows three basic elements contained within the control unit 4; a window parameter circuit 11, a selector circuit 12 and an analysis circuit 13. The circuit 11 decides when the system should be operating normally and when the system should be run to determine the oxygen buffer capacity. In order to decide this, the circuit 11 is set up so as to test whether a number of window parameters are fulfilled before proceeding with a test of the oxygen buffer capacity. Such parameters may for example include engine temperature, oil temperature, catalytic converter temperature, engine running time which has elapsed after initial engine ignition, engine running time since the last buffer capacity test and/or number of tests carried out in any one start-to-stop operation. Whilst further factors such as mass flow of fuel to the inlet side of an engine, mass flow of air to the inlet side of an engine, engine rotational speed and engine load may be included as window parameters, a linear correction can be made for any known value of these and thus such are not normally included in the window. However, constant engine speed and constant engine load may typically be window requirements to avoid transient effects.

A switching means is provided in the form of a selector circuit 12. When the window parameters are fulfilled, a signal is sent to the circuit 12 and a switching occurs such that the signal from the downstream sensor 3 is used as the primary input to the unit 4. This is thus equivalent to making the input 4b take the place of input 4a. In this way, the output signal from the downstream sensor will fluctuate in order to provide primary control of the fuel/air mixture.

The signal is analyzed by circuit 13 and the time information value(s) from the signal is/are compared to one or more predetermined value(s) so as to arrive at a measure of the oxygen buffer capacity. The circuit 13 may be additional to, and/or part of, the normal circuitry for providing a fuel injection control output via line 8 (output 4c). The analysis performed by circuit 13 is normally a measurement of the periodic time (time period), or average periodic time, of the fluctuations in the output signal from the downstream sensor. When the downstream sensor is used as the primary control input, the time period of the upstream sensor however also changes and thus either one may in fact be measured. As an alternative, the time information to be used can be the time displacement between the input signals from the upstream and the downstream sensor.

A calculation of the oxygen buffer capacity can then be made by a comparison calculation with known values of period time for various buffer capacities. Thus the actual buffer capacity can be determined as a particular time length, or the percentage buffer capacity remaining can be determined by comparison with corresponding values.

Figure 3:
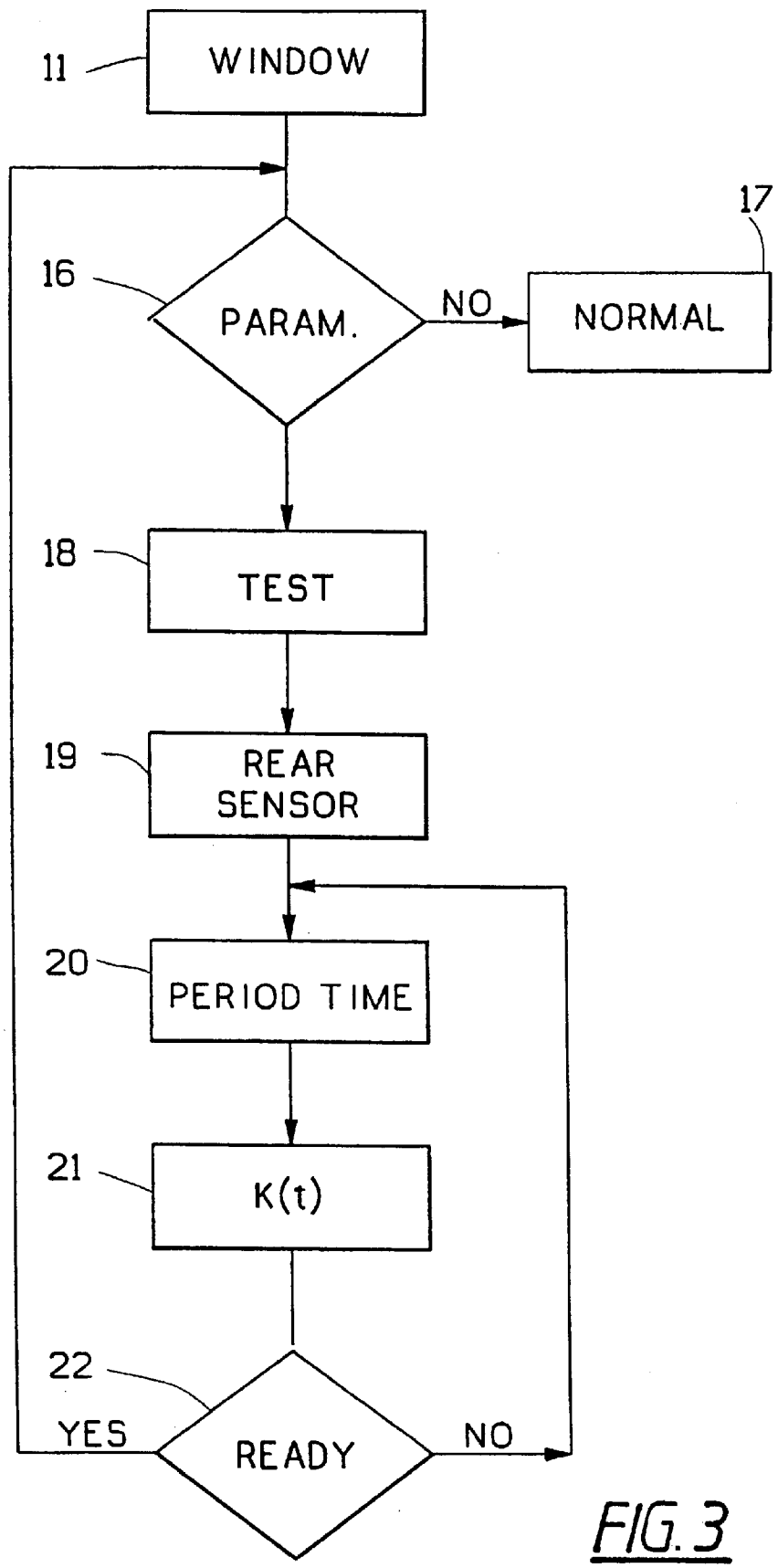
FIG. 3 is a typical flow chart for sampling a signal output from an oxygen sensor.

FIG. 3 shows a typical flow chart for a determination of the buffer capacity. A series of input parameters such as engine speed, load, temperature and/or time, are sent to window parameter block 11. In block 16 it is determined whether the window parameters of any window are fulfilled or not. If they are not fulfilled, block 17 is followed so that the air/fuel ratio continues to be adjusted on the basis of a primary signal from the upstream sensor. This will be the normal situation.

When the parameters of a window are fulfilled, block 18 indicates that a signal to initiate a test will be sent to selector block 12 in control unit 4. This will initiate block 19 which makes the control unit 4 receive the primary control input from input 4b such that fuel injection control is effected by the downstream sensor 3. The fluctuations of the signal input at 4b or 4a will then be analyzed (cf. block 20) in order to measure the time period of the fluctuations. Alternatively the signal inputs at inputs 4a and 4b will be analyzed to measure the time displacement between the two signals. Block 21 signifies that a determination of oxygen buffer capacity will then be made, this being a function of the analyzed time information, and hence the symbolism K(t). In block 22 a decision is made as to whether the analysis is complete. In the affirmative (YES), the analysis is terminated and the control unit 4 will assume normal operation. If negative (NO), the steps carried out in blocks 20 to 22 will be initiated again.

The flow chart is however only explanatory and it will be clear that many further possible alternative flow charts will be evident to the man skilled in the art.

Figure 4:
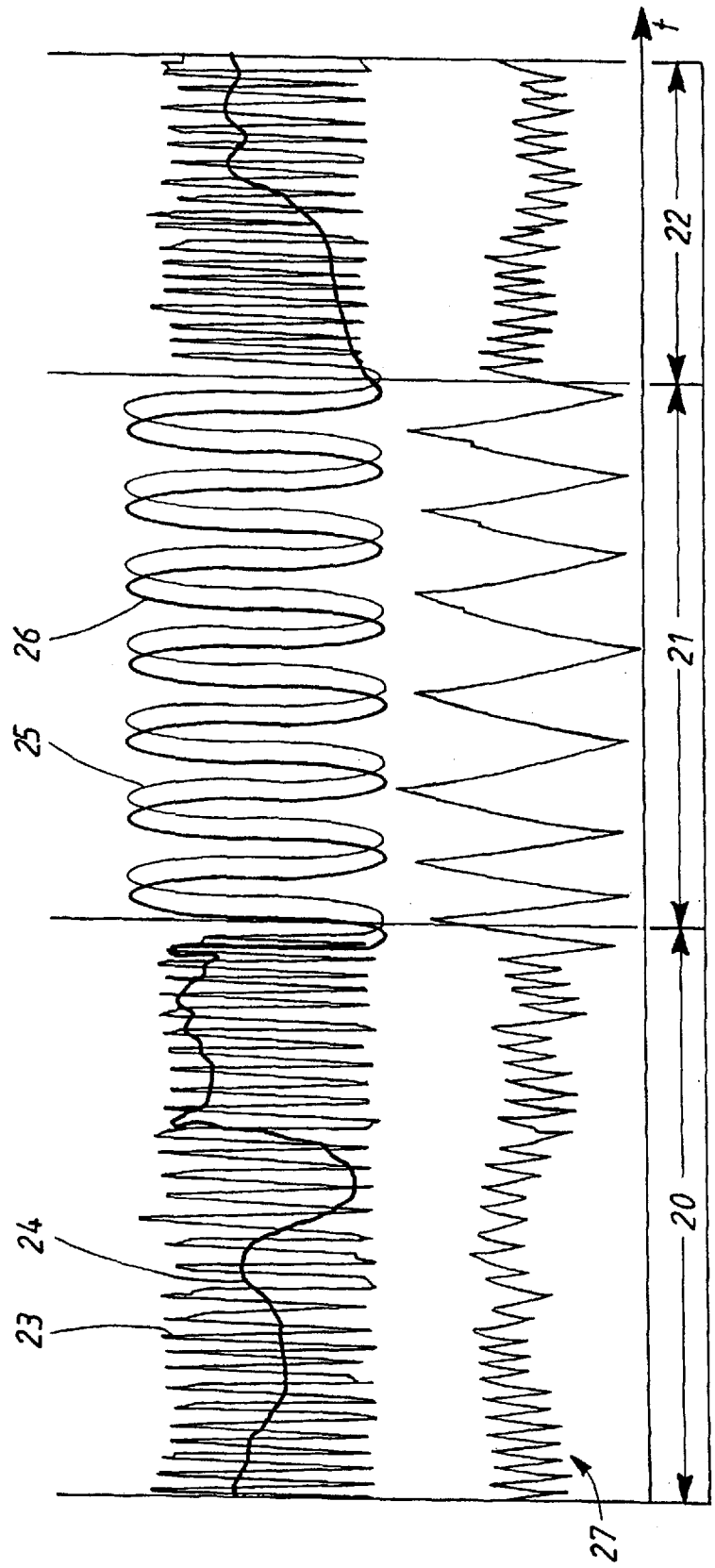
FIG. 4 depicts a typical set of signal outputs from an upstream and a downstream sensor before during and after switching the primary control input to be that output taken from the rear sensor.

The upper portion of FIG. 4 shows typical voltage output signals 23 and 25, and 24 and 26, from the front and rear oxygen sensors respectively, with respect to time (t). The lower portion of FIG. 4 shows an output value 27 corresponding to the typical applied factor for fuel injection time and thus how the length of injection timing can vary.

The graph is divided into three time zones 20, 21 and 22. Zone 20 is a zone in which the engine is running as normal with the primary input from the upstream sensor. Zone 21 is the analysis time zone with primary control input from the downstream sensor 3 and zone 22 is when the primary control input is switched back to the upstream sensor 2.

The output in zone 21 corresponds to a typical output measured over approximately ten seconds, although shorter or longer time zones can be used for zone 21.

In zone 20, the upstream sensor output 23 fluctuates rapidly which modifies the air/fuel ratio to lean and rich and then back again. The downstream sensor 3 output does not fluctuate rapidly but instead supplies a gently varying output to the fuel control unit 4 to richen or weaken the mixture by small increments.

In zone 21, the time period and size of the signal of the downstream sensor output 26 vary relatively rapidly as it alters the inlet mixture from weak to rich and back again. The output of the upstream sensor also follows this with a very similar fluctuation waveform, although with a distinct and relatively constant time lag compared to signal 25. As the oxygen buffer capacity decreases with an aging catalytic converter, the period of each of the signals becomes shorter and the time lag becomes less. Thus either of these time information sources may be used for the signal analysis. In zone 22 the output of the two sensors returns to its normal value as in zone 20. A zone similar to zone 21 will then recur when the window parameters are again fulfilled.

The fluctuating signal 27 shows a value corresponding to the typical applied factor for the injection time. This signal also varies in zone 21 since it is dependent on the resultant input signal from the rear sensor. In this way, the periodic time of the signal 27 in zone 21 can also be used to determine the buffer capacity. The signal 27 may have other fluctuation shapes (e.g. square wave form, etc.).

Figure 5:
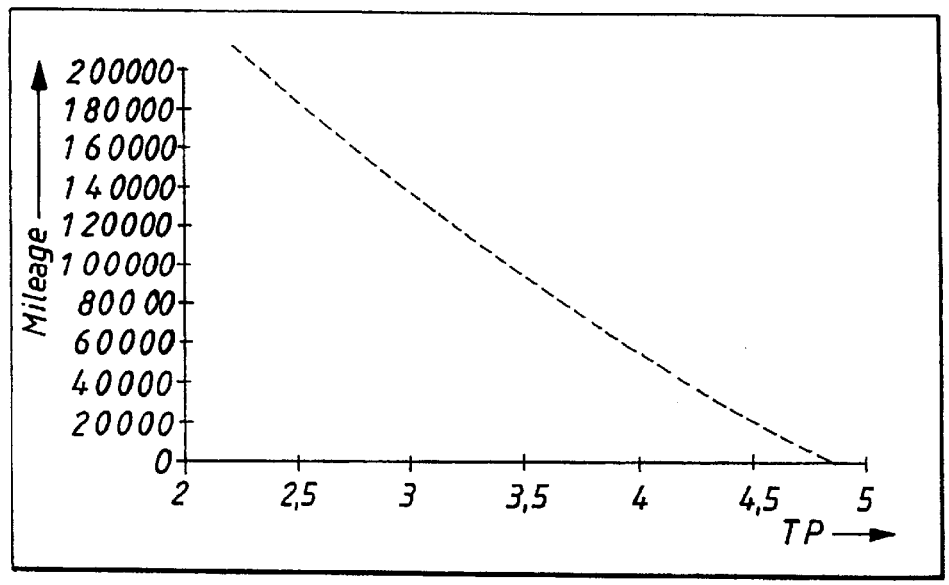
FIG. 5 depicts a typical graph showing the reduction of time period with aging of a catalytic converter.

FIG. 5 shows how the periodic time TP varies with the number of miles driven for a typical catalytic converter. Thus with a new catalytic converter, TP is almost five seconds whereas with an aged catalytic converter with 200,000 driven miles the time period has been reduced to about half. As is clear, TP reduces with the number of driven miles on an almost linear scale in this particular exhaust system. Since this reduction is due to the reduction in oxygen buffer capacity, a direct comparison can be made with known buffer capacity data in order to determine the present buffer capacity. Different curves will be produced for different vehicles.

Figure 6:
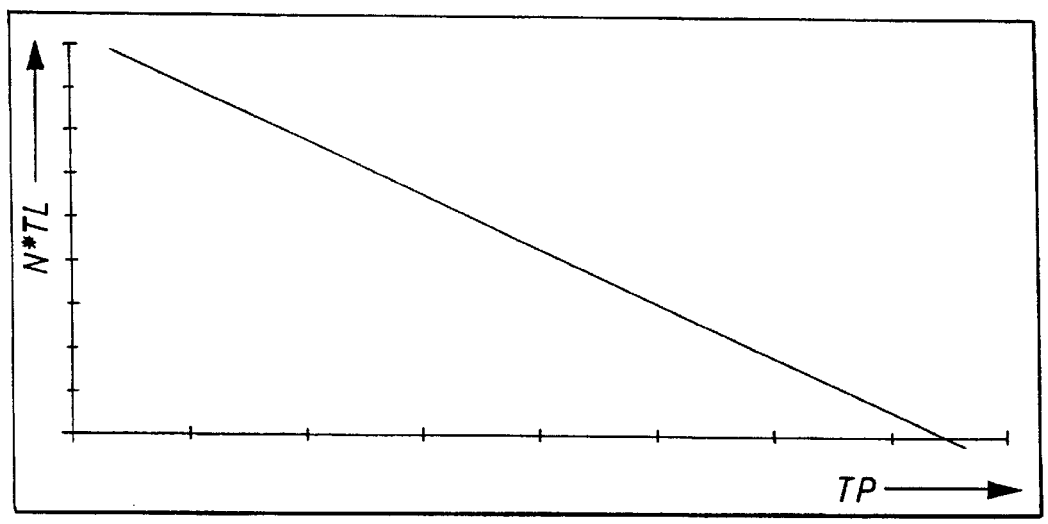
FIG. 6 shows how the periodic time of the fluctuations varies with mass flow (engine speed×load).

FIG. 6 shows how the periodic time TP varies linearly with mass flow of air or fuel/air into the engine. In the case shown, the vertical axis is marked N*TL, where N=engine speed and TL=load, the product of these two factors expressing mass flow. By using this graph, time period analysis can be carried out in accordance with the aforementioned method and arrangement at any known engine speed and load with a corrected value of periodic time being obtained for comparison with known values for certain buffer capacities. As explained above, this generally allows the factors of engine speed and load to be left out of the window parameters. However, engine tickover speed may cause some problems and thus a window parameter may be included so as to exclude any unwanted analysis below 1200 r.p.m. for example.

Once the oxygen buffer capacity is known, this value can be stored in a memory for subsequent use. By using this stored data, the fuel injection to the engine can then be modified so that the amount of oxygen buffer capacity never becomes depleted or completely full. This is achieved, for example, by using a short period of weakening and/or richening of the air/fuel mixture at appropriate intervals.

Richening may be achieved by a small extra quantity of fuel being injected so as to richen the mixture temporarily which will result in more hydrocarbons being passed into the exhaust gases so as to prevent the oxygen in the exhaust gases from filling the entire oxygen buffer capacity. The fuel may be injected by, for example, a marginally longer injection period compared to that required.

Similarly, mixture weakening can be performed in order to help fill the oxygen buffer capacity if it is being reduced.

The size of such buffer corrections will be made on the basis of the determined buffer capacity. Typically these corrections will occur during acceleration or deceleration phases and/or shortly thereafter.

What is claimed is:

1. A system for determining the oxygen buffer capacity of a catalytic converter comprising:

said catalytic converter including a converter matrix;

a downstream oxygen sensor located downstream from said converter matrix, said downstream oxygen sensor generating a first signal;

an upstream oxygen sensor located upstream from said converter matrix, said upstream oxygen sensor generating a second signal;

a fuel control unit in communication with said catalytic converter for receiving said first and second signals, wherein said second signal normally provides a primary input signal for controlling said fuel control unit, said fuel control unit providing an output signal for determining an air/fuel ratio of said system, said output signal being derived from said first and second signals, said fuel control unit including a switching element for selectively switching from a first state in which said second signal provides said primary input signal for said fuel control unit to a second state in which said first signal provides said primary input control signal for said fuel control unit and an analyzer circuit for determining time information about said signal;

a calculating element for calculating the oxygen buffer capacity of said catalytic converter in response to said time information; and wherein said fuel control unit alters the air/fuel ratio of the system in response to the oxygen buffer capacity determined by said calculating element.

2. A system according to claim 1, wherein said analyzer circuit compares the frequencies of said first and second signals so as to determine differences between said first and second signals.

3. The system as claimed in claim 1, said first and second signals having respective frequencies, wherein said analyzer circuit compares the respective frequencies of said first and second signals so as to determine phase differences between said respective frequencies of said first and second signals.

4. The system as claimed in claim 1, wherein said analyzer circuit measures the periodic time (TP) of the frequencies in said first and second signals and a frequency signal derived from said first and second signals.

5. The system as claimed in any one of claims 2, 3 or 4, said fuel control unit further including a window parameter circuit for identifying one or more predetermined parameters of said system, said window parameter circuit generating an output signal when one of said predetermined parameters is identified for activating said switching element.

6. The system as claimed in claim 1, said system further comprising a memory for storing the oxygen buffer capacity, wherein an air/fuel mixture ratio of said system is established in response to said oxygen buffer capacity.

7. A method for determining the oxygen buffer capacity of a catalytic converter in a system comprising:

providing a catalytic converter having a converter matrix;

providing an oxygen sensor downstream from said converter matrix;

providing an oxygen sensor upstream from said converter matrix;

generating a first signal from said downstream oxygen sensor and a second signal from said upstream oxygen sensor;

providing a fuel control unit in communication with said catalytic converter and supplying said first and second signals to said fuel control unit;

using said first and second signals to control the air/fuel ratio of the system;

switching from a first state in which said second signal provides a primary input signal for said fuel control unit to a second state in which said first signal provides said primary input control signal for said fuel control unit;

analyzing said first and second signals to determine time information about said first and second signals and using said first signal as said primary input signal for said fuel control unit when analyzing said first and second signals;

calculating the oxygen buffer capacity of said catalytic converter as a function of said time information when said first signal provides said primary input control signal for said fuel control unit; and altering the air/fuel ratio of said system in response to the calculation of the oxygen buffer capacity.

8. The method as claimed in claim 7, wherein said time information includes the frequency of said first signal.

9. The method as claimed in claim 7, wherein the time information includes the respective frequencies of said first and second signals.

10. The method as claimed in claim 9, wherein the time information includes phase differences between said respective frequencies of said first and second signals.

11. The method as claimed in claim 7, said fuel control unit having a window parameter circuit for identifying one or more predetermined parameters of said system, said method comprising the steps of:

evaluating said first and second signals so as to identify when one of said predetermined parameters has been achieved; and generating an output signal from said window parameter circuit when one of said predetermined parameters is achieved.

12. The method as claimed in claim 11, wherein said predetermined parameters are selected from the group consisting of the parameters of mass flow of fuel to an inlet side of an engine, mass flow of air to the inlet side of said engine, engine rotational speed, engine load, engine temperature, oil temperature, catalytic converter temperature, engine running time elapsed after initial engine ignition and engine running time since the last buffer capacity test.

13. The method as claimed in claim 7, the altering step including the step of enriching said air/fuel ratio.

14. The method as claimed in claim 13, wherein the enriching step includes injecting fuel into said system over a lengthier period of time than normally required to reach stoichiometric conditions.

15. The method as claimed in claim 13, wherein the enriching step includes supplying an additional quantity of fuel.

16. The method as claimed in claim 7, further comprising the step of weakening said air/fuel ratio by supplying said fuel over a shorter fuel injection time than normally required to reach stoichiometric conditions.

17. The method as claimed in claim 16, further comprising the step of weakening said air/fuel ratio by supplying a lower quantity of fuel.

* * * * *